(12) United States Patent
Yamamoto et al.

(10) Patent No.: US 8,035,905 B2
(45) Date of Patent: Oct. 11, 2011

(54) OPTICAL ELEMENT POSITIONING APPARATUS

(75) Inventors: Harushige Yamamoto, Yamato (JP);
Takumi Uehara, Kawasaki (JP);
Kazushige Ichino, Kokubunji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/768,409

(22) Filed: Apr. 27, 2010

(65) Prior Publication Data

US 2010/0290135 A1    Nov. 18, 2010

(30) Foreign Application Priority Data

May 13, 2009   (JP) .................................. 2009-116440

(51) Int. Cl.
*G02B 7/02* (2006.01)
*G03B 17/00* (2006.01)
(52) U.S. Cl. ........ 359/823; 359/813; 359/694; 359/696; 396/73; 396/349
(58) Field of Classification Search .................. 359/813, 359/819, 822, 823, 694–704; 396/55, 72, 396/73, 85, 348–350, 529; 348/208, 208.4
See application file for complete search history.

(56) References Cited

U.S. PATENT DOCUMENTS

| | | | |
|---|---|---|---|
| 7,369,333 B2 * | 5/2008 | Chigasaki et al. | 359/819 |
| 7,426,084 B2 * | 9/2008 | Bito et al. | 359/784 |
| 7,426,085 B2 * | 9/2008 | Yoshitsugu et al. | 359/819 |
| 7,652,830 B2 * | 1/2010 | Matsui et al. | 359/704 |
| 7,742,246 B2 * | 6/2010 | Miyamoto | 359/819 |
| 7,782,549 B2 * | 8/2010 | Hashi et al. | 359/725 |
| 7,787,193 B2 * | 8/2010 | Sakamoto et al. | 359/696 |
| 7,869,702 B2 * | 1/2011 | Hayashi et al. | 396/55 |
| 7,898,745 B2 * | 3/2011 | Matsui et al. | 359/694 |

FOREIGN PATENT DOCUMENTS

JP    09-284501    10/1997

\* cited by examiner

*Primary Examiner* — Loha Ben
(74) *Attorney, Agent, or Firm* — Cowan, Liebowitz & Latman, P.C.

(57) ABSTRACT

An optical element positioning apparatus capable of moving an optical element from a storage state to a use state and improving the accuracy of positioning the optical element to a use position on an optical path. A holding member that holds the optical element is guided by guide shafts to be movable between the storage state and the use state. The holding member is provided with guide-supporting and receiving portions through which the guide shafts are slidably inserted. The guide shafts are supported by holding portions. A degree of freedom in positioning the holding member at the use position is provided. Holding-member positioning parts of the guide-supporting and receiving portions are pressed by an urging device against ends of the holding portions, whereby the holding member is positioned and held at the use position.

3 Claims, 7 Drawing Sheets

OPTICAL ELEMENT POSITIONING APPARATUS

BACKGROUND OF THE INVENTION

1. Field of the Invention

The present invention relates to an optical element positioning apparatus suitable for use in an optical equipment having a bending optical system.

2. Description of the Related Art

An image pickup apparatuses is generally demanded to have a telephoto lens or a zoom lens and to have an ability of compactly storing a lens barrel at non-photographing time for ease of handling and transport of the image pickup apparatus.

To this end, some image pickup apparatus has a bending optical system that includes a reflection optical element such as a prism disposed between an object-side lens group attached to an extendable and retractable barrel and an image-side lens group for forming an image on an image pickup element disposed within an apparatus main body.

Another image pickup apparatus with a bending optical system has a lens barrel retractable into an empty space created by moving a reflection optical element to a retract position, so as to store the lens barrel inside a main body of the apparatus.

A film scanner (image pickup apparatus) has also been proposed that includes an optical source for illuminating a film screen, a photoelectric conversion means for fetching a film image, and an image forming optical system for leading the film image to the photoelectric conversion means, which are held by holding means that is movable in a direction perpendicular to a scanning direction of the photoelectric conversion means (see, for example, Japanese Laid-open Patent Publication No. 09-284501).

This image pickup apparatus includes an elastic member (pin spring) disposed between the holding means (carriage) and supporting means (lead screw) that drives and movably supports the holding means. The lead screw is lodged between the carriage and the pin spring, whereby play between the carriage and the lead screw is eliminated, thus making it possible to position the carriage with high accuracy.

With the prior art disclosed in Japanese Laid-open Patent Publication No. 09-284501, the carriage is movable in a state that play in a direction perpendicular to a moving direction of the carriage is reduced by the elastic member, whereby the carriage can be stably held at any desired position in its movable range.

However, in the case of an image pickup apparatus having a bending optical system (e.g., a portable compact digital camera), flexure is generated in, e.g., the lead screw due to the weight of the carriage depending on the orientation of the camera (such as vertical, horizontal, upward, or downward orientation). Specifically, when the camera orientation is changed, the carriage position slightly changes. Thus, even if the above-described prior art is applied to the image pickup apparatus of this type, it is difficult to position a reflection optical element of the image pickup apparatus with high accuracy.

SUMMARY OF THE INVENTION

The present invention provides an optical element positioning apparatus capable of improving the accuracy of positioning to a use position an optical element which is movable in an optical equipment such as an image pickup apparatus.

According to the present invention, there is provided an optical element positioning apparatus for moving an optical element from a storage position to a use position on an optical path and for positioning and holding the optical element at the use position, which comprises first and second guide shafts configured to guide a holding member that holds the optical element such that the holding member is movable between the storage position and the use position, holding portions provided in a stationary member and configured to hold ends of the first and second guide shafts on a side close to the use position of the optical element, guide-supporting and receiving portions provided in the holding member and formed with guide holes through which the first and second guide shafts are slidably inserted, and an urging device configured to urge holding-member positioning parts of the guide-supporting and receiving portions of the holding member moved to the use position such that the holding-member positioning parts are made in press-contact with ends of the holding portions.

With the present invention, it is possible to realize an optical element positioning apparatus that can reliably position to a use position an optical element which is movable in an image pickup apparatus.

Further features of the present invention will become apparent from the following description of an exemplary embodiment with reference to the attached drawings.

DETAILED DESCRIPTION OF THE PREFERRED EMBODIMENT

The present invention will now be described in detail below with reference to the drawings showing a preferred embodiment thereof.

Figure 1:
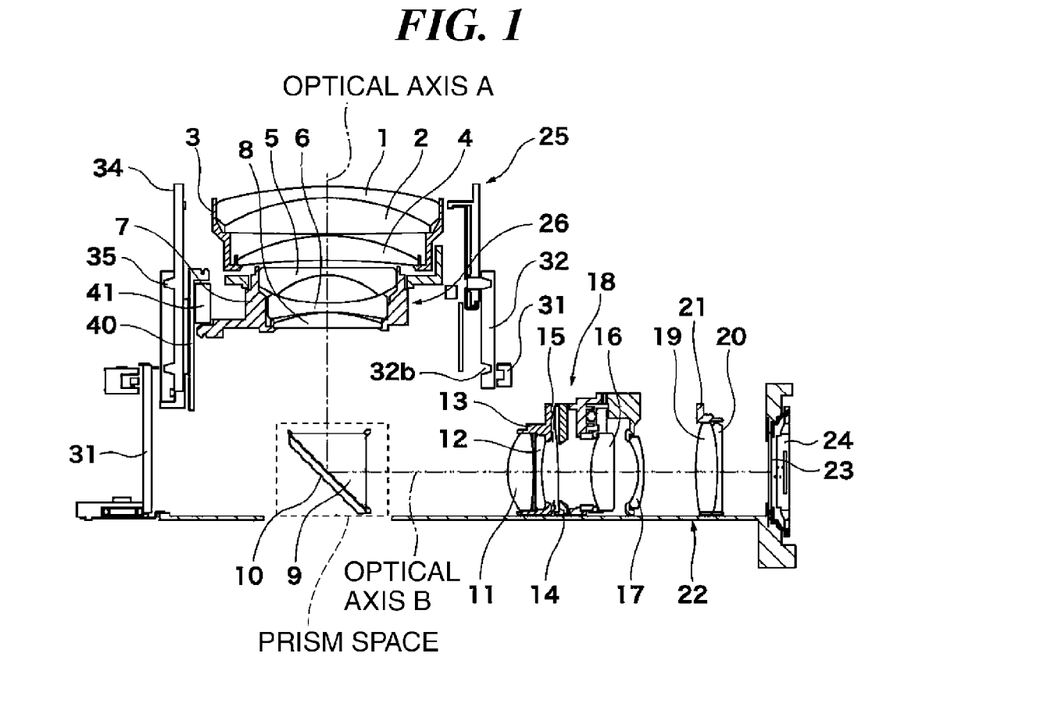
FIG. 1 is a section view schematically showing a photographing state of a barrel having a bending optical system, to which an optical element positioning apparatus according to one embodiment of this invention is applied.
Figure 2:
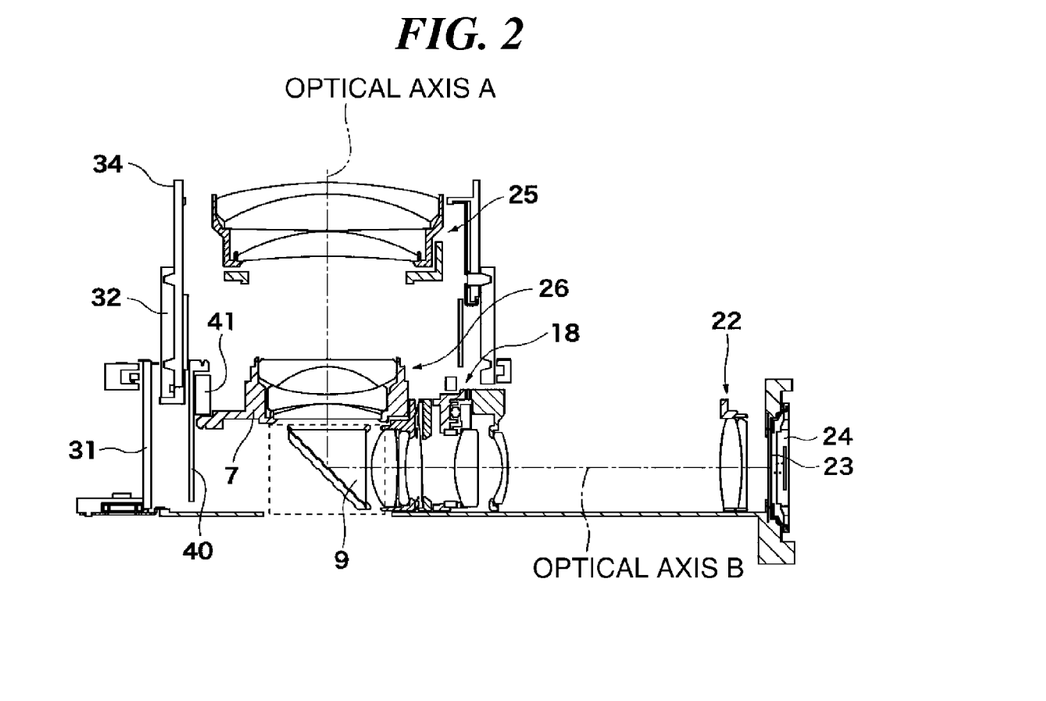
FIG. 2 is a section view schematically showing the barrel in a TELE state where a photography lens system is at a long focal length.
Figure 3:
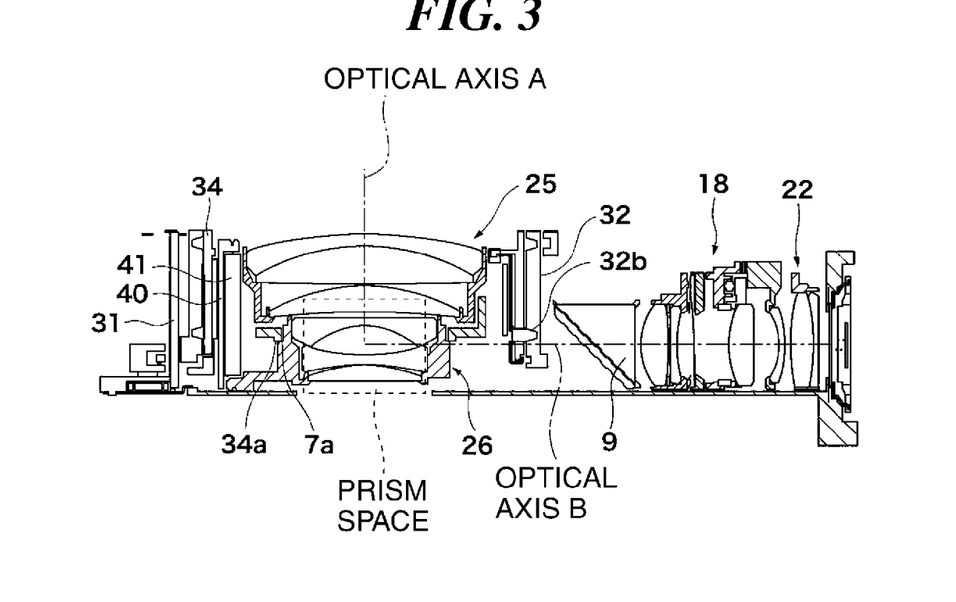
FIG. 3 is a section view schematically showing the barrel in a taking-lens storage state.

FIGS. 1 to 3 schematically show in cross section a barrel with a bending optical system, to which an optical element positioning apparatus according to one embodiment of this invention is applied, in a photographing state, in a TELE state where a photography lens system is at a long focal length, and in a taking-lens storage state, respectively.

As shown in FIGS. 1 to 3, the bending optical system has a first lens group 25, a second lens group 26, a third lens group 18, and a fourth lens group 22.

The first lens group 25 is comprised of a G1 lens 1, a G2 lens 2 affixed to the G1 lens 1, and a G3 lens 4, which are held by a first group lens holder 3.

The second lens group 26 is comprised of G4, G5, and G6 lenses 5, 6, and 8, which are incorporated in a second group lens holder 7 such that the G4 and G5 lenses 5, 6 are in marginal contact with each other to have specified positions in optical axis direction and the G6 lens 8 is disposed rearward of the lenses 5, 6.

The second group lens holder 7 is coupled and fixed to a second group holding member 40 via a spring 41. The lens groups are driven for a zooming operation by a drive source, e.g., a stepping motor, not shown, to advance and retreat in a direction of an optical axis A.

The bending optical system includes a prism 9 as a reflection optical element having a function of bending the photographing optical axis A by 90 degrees toward a second optical axis B. The prism 9 is held by a prism holding member (prism holder) 10. The prism holding member 10 is movable to advance and retreat along the optical axis B in a state where it holds the prism 9.

The bending optical system includes a third lens group 18 of the taking lens disposed on the optical path at a location rearward of the prism 9 (on the side of an image pickup element 24) for advance and retreat movements for zooming operation along the optical axis B.

To this end, the third lens group 18 includes a G7 lens 11 and a G8 lens 12 disposed rearward of the G7 lens 11, which are held by a holding member and fixedly disposed at a location forward of a front shutter base plate 13.

The third lens group 18 further includes a shutter and iris mechanism 15 that controls an amount of photographing light and that is fixed and disposed between the front shutter base plate 13 and a rear shutter base plate 14.

In addition, the third lens group 18 includes G9 and G10 lenses 16, 17 which are held by the holding member at a location rearward of the shutter and iris mechanism 15 and fixed to the rear shutter base plate 14.

The bending optical system further includes a fourth lens group 22 disposed on the optical path at a location rearward of the third lens group 18 (on the side of the image pickup element 24). The fourth lens group 22 is driven for zooming and in-focusing operations by a drive source, e.g., a stepping motor, not shown, to advance and retreat in the direction of the optical axis B.

To this end, the fourth lens group 22 includes G11 and G12 lenses 19, 20 which are affixed together and fixed to a fourth group lens holder 21 configured to be driven to advance and retreat.

In the bending optical system, the image pickup element 24 is disposed at the end of the optical path located rearward of the fourth lens group 22. An optical filter 23 having a lowpass filter function for cutting light having a high spatial frequency or a function for cutting infrared light is disposed in front of the image pickup element 24.

By constructing the bending optical system as described above, a photography optical system is completed. With this optical system, an object image is formed on the image pickup element 24 and a picked-up image is converted into an electrical signal, thereby obtaining an electrophotograph.

When the photography optical system is set to the photographing state shown in FIG. 1, the photography lens system is set to a WIDE position for wide-angle photography.

When the photography optical system is set to the TELE state shown in FIG. 2, the photographing can be made in the TELE state where the photography lens system is at a long focal length.

In the TELE state, the first lens group 25 is kept disposed at the WIDE position, and the second lens group 26 is driven by, e.g., a step motor (not shown) to retreat along the optical axis A and is set at a predetermined position near the prism 9. The third lens group 18 is driven by, e.g., a stepping motor (not shown) along the optical axis B and is set at a predetermined position near the prism 9. The fourth lens group 22 is driven by, e.g., a stepping motor along the optical axis B and is set at a predetermined position near the image pickup element 24.

When the image pickup apparatus is not in use, the photography optical system is set to the taking-lens storage state shown in FIG. 3.

In the taking-lens storage state, the prism 9 is driven along the optical axis B to a retreat position where the prism 9 is disposed away from the photographing optical axis A, and the first lens group 25 held by the first group barrel 34 and the second lens group 26 built in the second group holder 7 are driven along the optical axis A to their storage positions. At that time, the first group barrel 34 in a state that an abutment portion 34a thereof abuts against a flange portion 7a of the second group lens holder 7 is moved to a storage position, to move the second group lens holder 7 to a storage position against an urging force of the spring 41. The prism 9 at the retreat position does not interfere with the third and fourth lens groups 18, 22. A most part of the second lens group 26 at the storage position is disposed in a prism space where the prism 9 has been positioned at the photographing.

Next, with reference to FIG. 4, a drive mechanism for first lens group and a prism retraction mechanism will be described.

Figure 4:
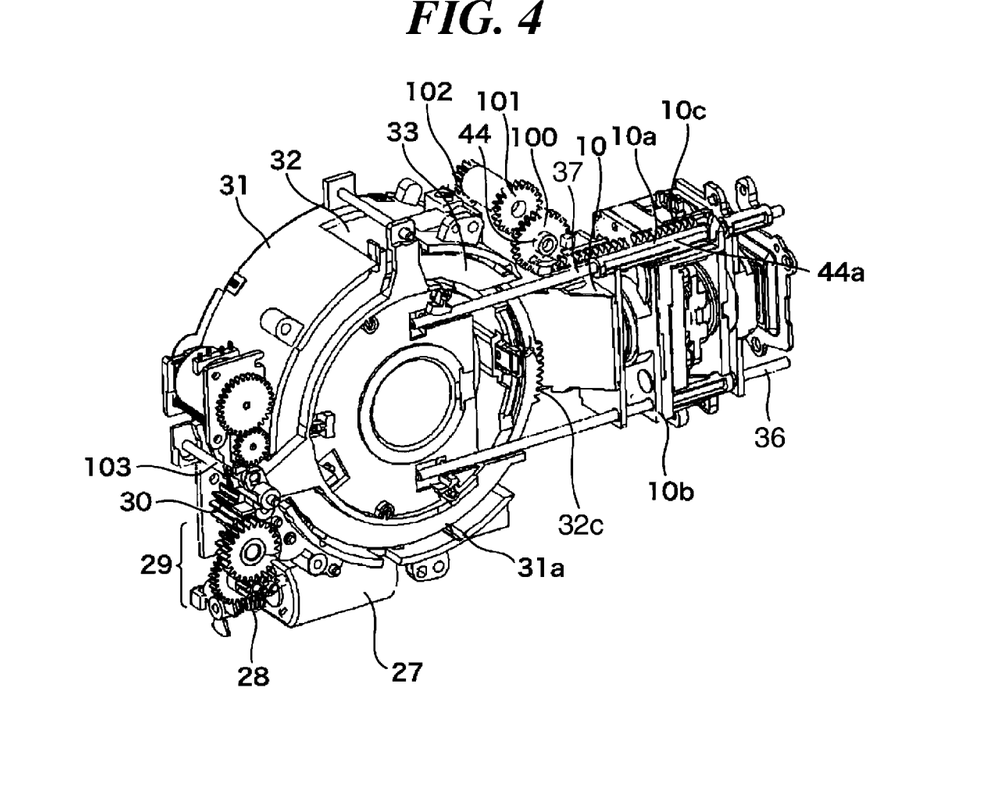
FIG. 4 is a section view schematically showing the barrel in a storage state.

FIG. 4 schematically shows in perspective view the barrel in the storage state.

The drive mechanism for the first lens group 25 is configured to include, as a drive source thereof, a motor 27 of an ordinary type. The motor 27 has an output shaft to which a worm gear 28 is press-fitted and attached. A speed reducing gear train 29 is connected to the worm gear 28. The gear train 29 has a final stage drive gear 30, which is rotatably attached to a fixed cylinder 31.

The fixed cylinder 31 has an inner periphery formed with cam grooves 31a, described later. Cam pins 32a (shown in FIG. 6) fixed to or integrally formed with a differential cylinder 32 are slidably engaged with the cam grooves 31a.

The differential cylinder 32 is formed with a gear (not shown) which is in mesh with the drive gear 30 whose rotational driving force is transmitted to the differential cylinder 32, whereby the differential cylinder 32 is rotatably driven. At that time, by the action of the cam grooves, the differential cylinder 32 is moved to advance and retreat along the optical axis A.

A linear motion guide cylinder 33 is attached to an inner periphery of the differential cylinder 32 so as to be rotatable relative to the differential cylinder 32 and movable along the optical axis A in unison with the cylinder 32. Cam grooves 32b (shown in FIGS. 1 and 3) are formed on the inner periphery of the differential cylinder 32.

The first group barrel 34 (see, FIGS. 1 and 3) retaining the first lens group 22 is held between the inner periphery of the differential cylinder 32 and an outer periphery of the linear motion guide cylinder 33. Cam pins 35 (shown in FIG. 1) fixed to or integrally formed with the first group barrel 34 are slidably engaged with the cam grooves 32b formed in the differential cylinder 32.

A convex portion (not shown) is formed on the outer periphery of the linear motion guide cylinder 33 and is in slidable engagement with an engagement groove formed in an inner periphery of the first group barrel 34, whereby a rotational motion of the first group barrel 34 is restricted.

In the drive mechanism for first lens group, with the rotation of the differential cylinder 32 by the driving force of the motor 27, the first group barrel 34 is moved to advance and retreat relative to the differential cylinder 32 in the direction of the optical axis A by the engagement between the cam grooves formed in the inner periphery of the differential cylinder 32 and the cam pins 35 of the first group barrel 34 and by the engagement between the convex portion of the linear motion guide cylinder 33 and the engagement groove formed in the inner periphery of the first group barrel 34. The first group barrel 34 moved to advance and retreat relative to the differential cylinder 32 drives the first group lens between the storage position and the photographing position.

Next, the prism retraction mechanism is described.

The prism retraction mechanism includes two guide shafts 36, 37 and includes an engagement portion 10a and a steady rest portion 10b (guide-supporting and receiving portions) of the prism holding member 10 which are in engagement with respective ones of the guide shafts 37, 36 so as to be slidable relative thereto in the direction of the optical axis B.

It should be noted that the engagement portion 10a and the steady rest portion 10b can be formed integrally with or separately from the prism holding member 10.

The engagement portion 10a of the prism holding member 10 is formed into an elongated tube. A rack portion 10c is provided near the engagement portion 10a. The rack portion 10c is in mesh with the prism drive gear 100 that causes the prism holder 10 to advance and retreat along the optical axis B.

Either one of two speed reducing gears 101, 102 is in mesh with the prism drive gear 100. The speed reducing gear 102, which is in mesh with the prism drive gear 100 when the first group barrel 34 is in the storage position, is configured to be rotatable in only one direction by the action of a torsion spring.

With this construction, the prism holding member 10 can be stably kept stopped in the illustrated retract position.

Specifically, during the time the first group barrel 34 is being extended by the driving force of the motor 27 to a photographing standby position along the optical axis A, no driving force is given to the speed reducing gears 101 and 102, and therefore, the prism holding member 10 is kept stopped at the retract position.

When the first group barrel 34 is being extended to the photographing position, the differential cylinder 32 freely rotates. To this end, those portions of cam grooves 31a, 32b formed in inner peripheral surfaces of the fixed cylinder 31 and the differential cylinder 32, which correspond to the operation of extending the first group barrel 34 to the photographing position, are formed into no-lift sections, i.e., parallel sections (the parallel section of one cam groove 31a is shown at 31a-2 in FIG. 6).

During when the first group barrel 34 is being extended to the photographing position and the differential cylinder 32 freely rotates, a gear 32c (shown in FIG. 4) formed on a rear outer periphery of the differential cylinder 32 and rotating in unison with the cylinder 32 is in mesh with the speed reducing gear 101. The speed reducing gear 101 and the prism drive gear 100 are rotated by a rotational driving force of the gear 32c, and the rack 10c of the prism holding member 10 is driven, whereby the prism holding member 10 is driven to the photographing standby position and set to a photographing state shown in FIG. 5.

Figure 5:
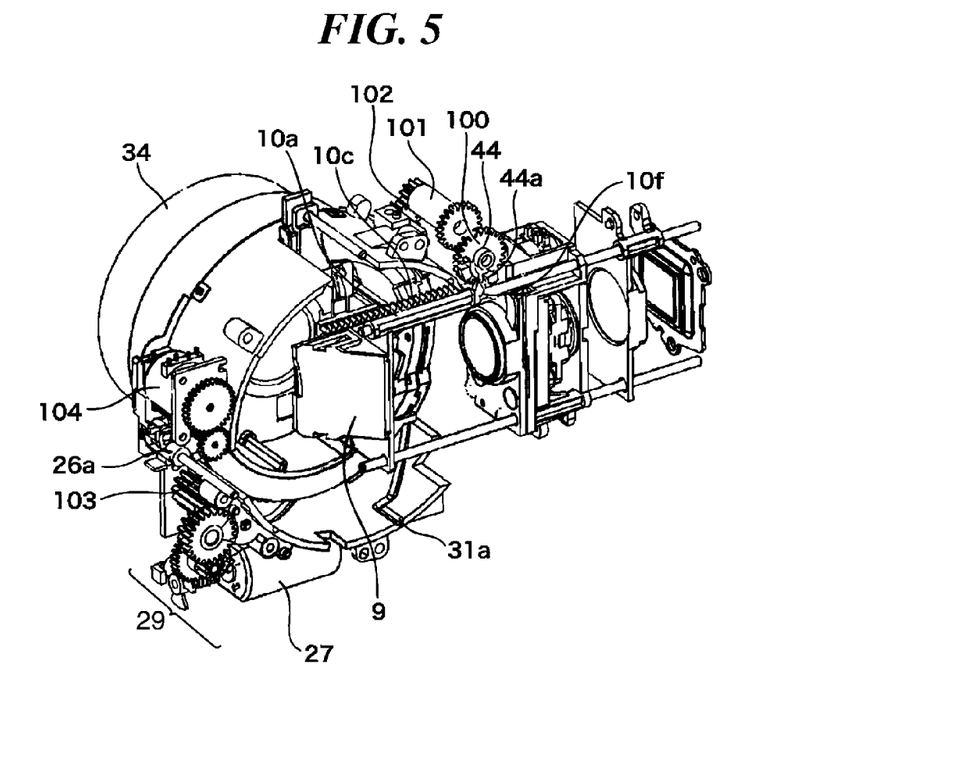
FIG. 5 is a perspective view showing a state where a first group barrel and a prism holding member are set in a photographing state.

FIG. 5 shows in perspective view a state where the first lens barrel 34 and the prism holding member 10 are set in the photographing state.

As shown in FIG. 5, the second lens group 26 is configured to be driven by a stepping motor 104 as a driving device so as to be extended and retracted along the optical axis A, while being guided by a guide mechanism having a guide-hole-formed portion 26a through which a support bar 103 is slidably inserted.

To control the drive of the prism holding member 10 to the photographing standby position, the motor 27 is kept rotating after the first group barrel 34 and the second group holder 7 are extended to the photographing standby position.

The rotational driving force of the motor 27 is conveyed to the prism drive gear (pinion) 100, whereby the prism drive gear 100 is caused to rotate and the rack portion 10c of the prism holding member meshing with the prism drive gear 100 is rectilinearly driven. As a result, the prism holding member 10 is moved to the photographing position.

Figure 13:
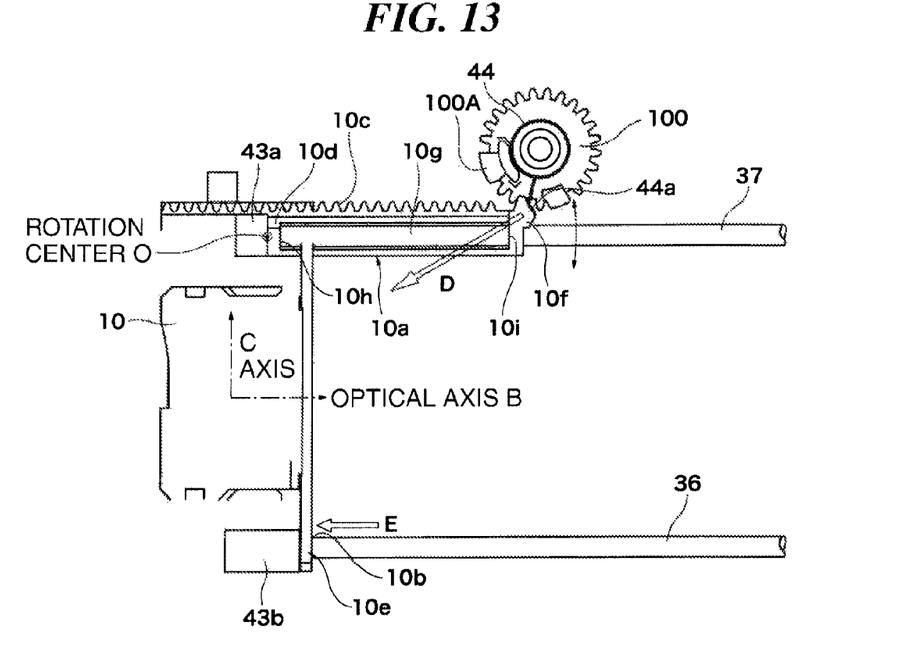
FIG. 13 is a schematic bottom view showing a state where the prism holding member is elastically pressed against holding portions.

In a final stage of the drive control of the prism holding member 10 to the photographing standby position, even after the engagement between the prism drive gear 100 and the rack portion 10c is released, the prism drive gear 100 is kept rotating, whereby a torsion spring 44, which is a spring member attached to the prism drive gear 100, is also kept rotating. As a result, an arm 44a of the torsion spring 44 is brought to abut against a force receiving portion 10f of the engagement portion 10a and is elastically deformed to urge the force receiving portion 10f with a sufficient pressing force. This state is shown in FIGS. 11 and 13.

Figure 11:
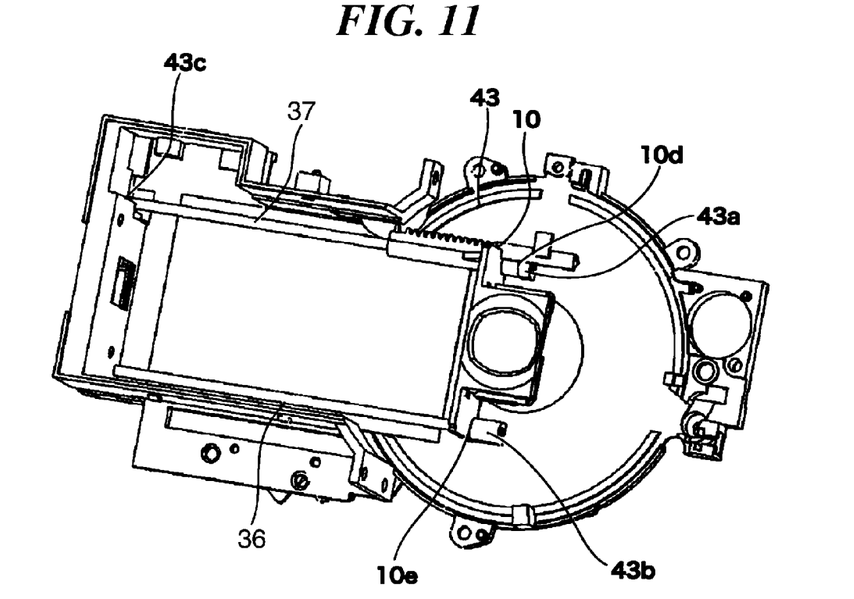
FIG. 11 is a schematic perspective view showing a state where the prism holding member is set to the photographing position.

FIG. 11 schematically shows in perspective view a state where the prism holding member 10 is set to the photographing position.

In FIG. 11, reference numeral 43 denotes a housing in which the prism holding member 10 and lens groups are incorporated. The housing 43 is formed with holding portions 43a, 43b that hold the guide shafts 37, 36. It should be noted that the holding portions 43a, 43b can be provided on a stationary member, which is a part of the housing 43 or is formed integrally with the housing 43 (e.g., a fixing member or a fixed cylinder, which is a part of the housing 43 or is integrally fixed to the housing 43).

Abutment portions 10d, 10e of the prism holding member 10 are in elastic press-contact with end surfaces (abutment surfaces) of the holding portions 43a, 43b, so that the prism holding member 10 is prevented from being rattled and backlash is eliminated, whereby the prism 9 can be positioned at the use position with high accuracy.

Next, with reference to FIGS. 12 and 13, a description will be given of details of the construction for moving the prism 9 in unison with the prism holding member 10 to the photographing position (use position) and for highly accurately positioning and holding the prism 9 thereat.

Figure 12:
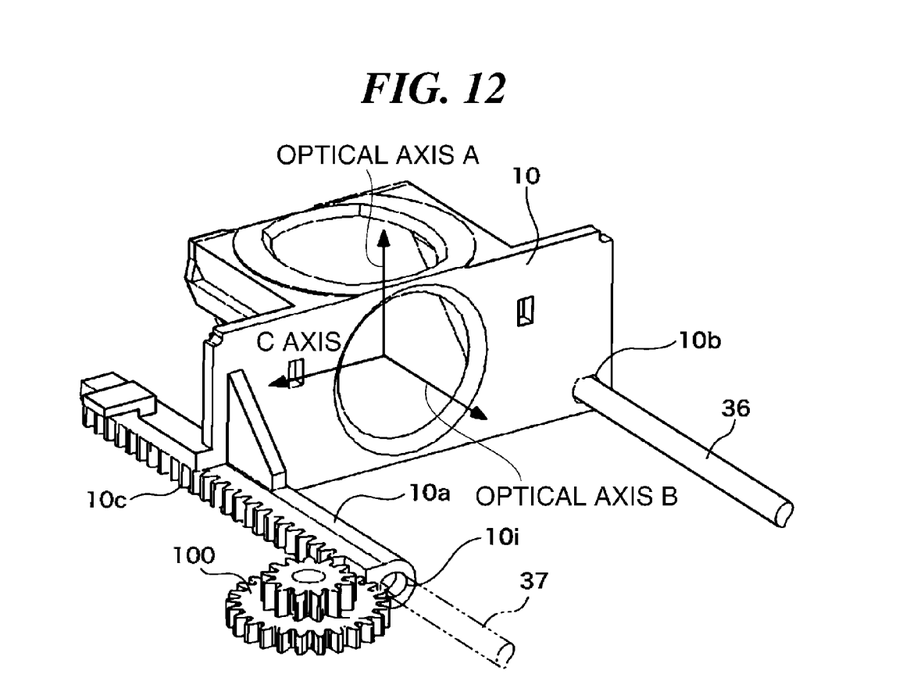
FIG. 12 is a perspective view for explaining a function of guide holes of the prism holding member.

FIG. 12 shows in perspective view a function of guide holes of the prism holding member (prism holder) 10.

Figure 14A:
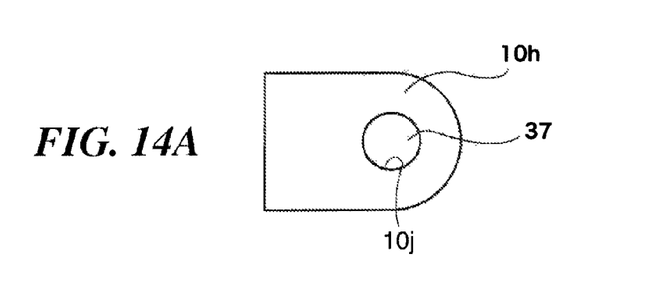
FIG. 14A is a fragmentary enlarged view showing a guide hole formed at a tip end of an engagement portion of the prism holding member.
Figure 14B:
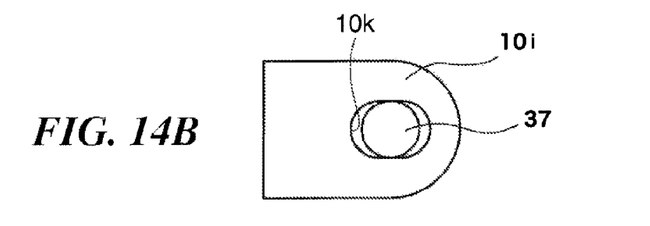
FIG. 14B is a fragmentary enlarged view showing a guide hole formed at a rear end of the engagement portion of the prism holding member.

FIG. 13 schematically shows in bottom view a state where the abutment portions 10d, 10e of the prism holding member 10 are in elastic press-contact with end surfaces of the holding portions 43a, 43b of the housing 43. FIGS. 14A and 14B show, along a plane including the optical axis A and a C axis, guide holes 10j, 10k formed at a tip end 10h and a rear end 10i of the engagement portion 10a of the prism holding member 10.

As shown in FIG. 14A, the guide shaft 37 is fitted into the guide hole (fitting hole) 10j formed in the tip end 10h of the engagement portion 10a of the prism holding member 10. As shown in FIG. 14B, the guide shaft 37 is fitted into the guide hole (fitting hole) 10k formed in the rear end 10i near the force receiving portion 10f of the engagement portion 10a such that a degree of freedom around the optical axis A is provided, but a degree of freedom around the C-axis is not provided. In other words, the engagement portion 10a is formed with a guide hole (through-hole) extending between the tip end 10h and the rear end 10i. As shown in FIG. 13, a relief 10g is formed in the guide hole between the both ends of the engagement portion 10a by die-sliding molding.

The guide hole 10j is formed into a circular hole that opens to a tip end surface of the engagement portion 10a. The guide hole 10k opens to a rear end surface of the engagement portion 10a, and is formed into an elongated hole expanded in the direction of a B-C plane defined by the optical axis B and the C-axis, as shown in FIGS. 12 and 14B. In the illustrated example, the B-C plane includes the guide shafts 36, 37 and therefore the guide hole 10k is expanded in the direction of the plane including the guides shafts 36, 37.

Specifically, the guide hole 10k provides a degree of motion (play) of the prism holding member (prism holder) 10 relative to the guide shaft 37 in the direction of the B-C plane. As a result, the prism holding member 10 is able to rotate around the optical axis A about the guide hole 10k (guide shaft 37) to some extent.

Next, with reference to FIG. 13, a description will be given of operation when the abutment portions 10d, 10 of the prism holding member 10 (holding-member positioning parts) constructed as above are made in elastic press-contact with the end surfaces (abutment surfaces) of the holding portions 43a, 43b.

As previously described, with rotation of the torsion spring 44, the arm portion 44a of the spring 44 presses the force receiving portion 10f of the engagement portion 10a of the prism holding member 10 in a final stage of control of the drive of the prism holding member 10 to the photographing standby position (use state).

A force receiving surface of the force receiving portion 10f of the prism holding member 10 has an inclination at which a force of the arm portion 44a pressing the force receiving portion 10f acts in a direction shown by arrow D in FIG. 13.

The prism holding member 10 is rotated clockwise around a rotation center O in FIG. 13 by the pressing force of the arm portion 44a, and there is a degree of freedom of two-dimensional motion of the prism holding member 10 in the B-C plane. Accordingly, an urging force E acts on the abutment portion 10e of the prism holding member 10, whereby the abutment portion 10e is firmly pressed against the end surface of the holding portion 43b, and the prism holding member 10 is positioned at the use position.

In other words, according to this embodiment, there is provided a mechanism for positioning the prism 9 (the optical element provided in the barrel having the bending optical system), which includes a moving operation mechanism that moves the prism holding member 10 holding the prism 9 to the photographing standby position (use state). In succession, the prism-positioning mechanism positions and holds the prism 9 at the use position.

As shown in FIG. 13, the prism-positioning mechanism includes the holding portions 43a, 43b for supporting the use-position side ends of the guide shafts 37, 36, these holding portions being provided at two spaced places of the housing 43 (stationary member) in which lens groups are incorporated. Tip end surfaces of the holding portions 43a, 43b (holding-portion end surfaces) function as positioning ends.

The abutment portions 10d, 10e provided at the two places of the prism holding member 10 are elastically pressed against the end surfaces (abutment surfaces) of the holding portions 43a, 43b, whereby the prism 9 is positioned and held.

Further, the mechanism for guiding a movement of the prism holding member 10 is configured to provide the degree of freedom (play) such that the prism holding member 10 can be inclined by a small angle relative to the optical axis B in the B-C plane.

Repeatedly speaking, the prism-positioning mechanism of this embodiment is configured such that the prism holding member 10 is movable along the optical axis B while being guided by the two guide shafts 36, 37.

To this end, the elongated tubular engagement portion 10a as a guide-supporting and receiving portion is disposed at one side of the prism holding member 10, and the steady rest portion 10b serving as a guide-supporting and receiving portion and formed with a through-hole (guide hole) is provided at the other side of the prism holding member 10.

The guide shaft 37 is slidably inserted into the through-hole of the elongated tubular engagement portion 10a, and the guide shaft 36 is slidably inserted into the through-hole of the steady rest portion 10b, whereby the prism holding member 10 is movably attached to the guide shafts 36, 37.

The guide hole 10j in the engagement portion 10a of the prism holding member 10 is formed into a circular hole that opens to the tip end 10h adapted to abut against the end surface of the holding portion 43a.

The guide hole 10k at the rear end 10i of the engagement portion 10a is formed into an elongated hole extended in the direction of the B-C plane, as shown in FIGS. 12 and 14B.

To prevent the guide-hole defining surface of an intermediate part between the tip and rear ends of the engagement portion 10a from being in contact with the guide shaft 37, the guide hole is enlarged in diameter to form the relief 10g at the intermediate part of the engagement portion 10a.

With the engagement portion 10a constructed as above, the rear end 10i of the engagement portion 10a through which the guide shaft 37 is inserted is movable about the guide hole 10j of the tip end 10h within a range of the degree of motion freedom given by the elongated hole extended in the direction of the B-C plane.

Thus, the prism holding member 10 is supported by the guide shafts 36, 37 with the degree of freedom (play) in which the prism holding member 10 can be inclined at a small angle relative to the optical axis B in the B-C plane.

The rack portion 10c is provided integrally with and longitudinally along the engagement portion 10a of the prism holding member 10, and the prism drive gear 100 rotationally drive-controlled is made in mesh with the rack portion 10c, thereby constructing the movement operation mechanism for moving the prism holding member 10 in the optical axis B.

The movement operation mechanism rotatably drives the prism drive gear 100 to thereby cause the prism holding member 10 to advance and retreat along the optical axis B in unison with the rack portion 10c.

The prism-positioning mechanism is configured integrally with the movement operation mechanism.

To this end, the rack portion 10c is provided at its rear end with a non-tooth portion where the prism drive gear 100 is able to freely rotate.

Further, the force receiving portion 10f is provided on the rear side of the non-tooth portion of the rack portion 10c. The force receiving portion 10f is formed into one large triangular teeth having front and rear slant surfaces. The free arm portion 44a of the torsion spring 44 whose another end portion is fixed to the prism drive gear 100 is brought in press-contact with the rear slant surface of the force receiving portion 10f.

The rear slant surface of the force receiving portion 10f is formed to have an inclination angle at which a force applied thereto when the arm portion 44a of the torsion spring 44 is press-contact with the rear slant surface can be nearly equally distributed to the abutment portions 10d, 10e of the engagement portion 10a. To this end, the inclination angle of the rear slant surface of the force receiving portion 10f is set such that a line of action of the urging force of the arm portion 44a passes through an intermediate position between the abutment portions 10d, 10e of the prism holding member 10.

In that case, a press-contact force between the abutment portion 10d of the prism holding member 10 and the holding portion 43a of the housing 43 becomes nearly equivalent to a press-contact force between the abutment portion 10e of the prism holding member 10 and the holding portion 43b of the housing 43, whereby the prism holding member 10 can be positioned with stability.

Specifically, the prism-positioning mechanism causes the abutment portions 10d, 10e of the prism holding member 10 to press against the end surfaces of the holding portions 43a, 43b of the housing 43, thereby positioning the prism holding member 10. At this time, the prism holding member 10 is able to move in the B-C plane while changing an angle relative to the optical axis B.

Prior to the positioning operation, an operation of moving the prism holding member 10 to the photographing standby position is performed. In the moving operation, the prism drive gear 100 is rotatably driven to move the prism holding member 10 to a location near the photographing standby position (use state), whereupon the prism drive gear 100 is positioned at the non-tooth portion of the rack portion 10c and caused to freely rotate for a predetermined time period.

With the rotation of the prism drive gear 100, the arm portion 44a of the torsion spring 44 whose another end portion is fixed to the prism drive gear 100 is rotated and brought in contact with the force receiving portion 10f. Then, the prism drive gear 100 further rotates by a predetermined angle and stops rotating.

The arm portion 44a of the torsion spring 44 rotating in unison with the prism drive gear 100 abuts against the force receiving portion 10f with a desired pressing force, whereby the abutment portions 10d, 10e (holding-member positioning parts) of the engagement portion 10a are positioned by being caused to abut against the end surfaces (abutment surfaces) of the holding portions 43a, 43b of the housing 43 (stationary member).

In the movement operation mechanism for the prism holding member 10, there is provided a driven mechanism for bringing the prism drive gear 100 freely rotating at the non-tooth portion of the rack portion 10c in mesh with the rack portion 10c. Specifically, a slant driven surface is formed on a rack-portion side of the force receiving portion 10f, and an operating projection 100A is provided that protrudes from a side surface of the prism drive gear 100.

With the movement operation mechanism for the prism holding member 10 constructed as above, the prism drive gear 100 is rotated anticlockwise in FIG. 13 during when the prism holding member 10 is moved from the photographing position to the storage position, whereby the operating projection 100A rotating in unison with the prism drive gear 100 is brought in contact with the rack-portion side slant surface of the force receiving portion 10f. As a result, the prism drive gear 100 is brought in mesh with a tooth of the rack portion 10c. Subsequently, the prism drive gear 100 is rotatably driven to move the rack portion 10c meshing with the gear 100, whereby the prism holding member 10 is moved from the photographing position to the storage position.

Next, with reference to FIG. 6, a description will be given of a part for changing positions of the differential cylinder 32 and the first group barrel 34 relative to the fixed cylinder 31 in relation to the operation of moving the prism 9 between the storage position and the photographing standby position.

Figure 6:
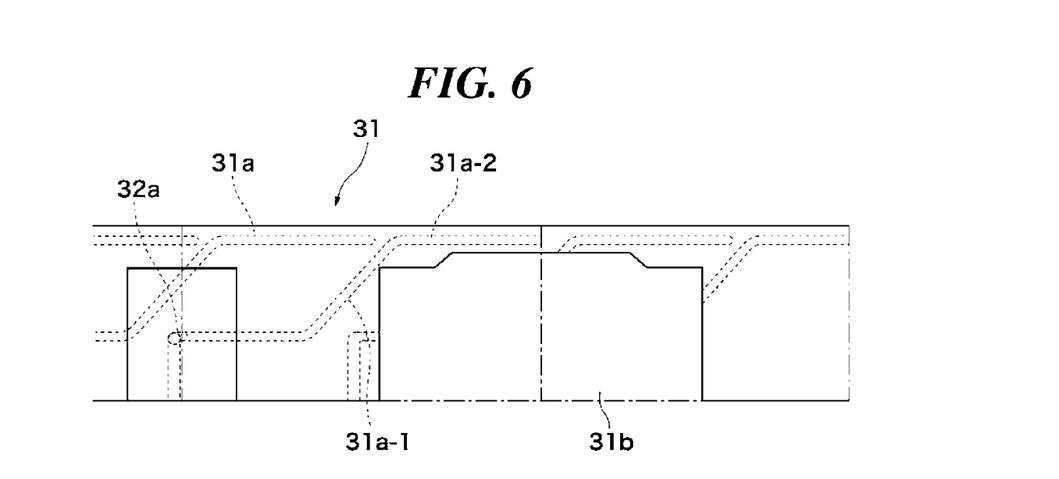
FIG. 6 is a development view showing a planarly developed outer surface of a fixed cylinder of the barrel at a part having a notched opening that permits a prism to pass therethrough.

FIG. 6 shows in planarly developed view an outer surface of the fixed cylinder 31 at a part having a notched opening 31b that permits the prism 9 to pass therethrough.

As previously described, the fixed cylinder 31 is formed with the cam grooves 31a with which the cam pins 32a that are fixed to or integrally formed on the differential cylinder 32 are slidably engaged. In FIG. 6, one of the cam pins is denoted at 32a in a case that the differential cylinder 32 is at the storage position.

With rotation of the motor 27 to shift the first lens group 22 in the barrel from the storage state to the photographing standby state, the can pins 32a are driven along the cam grooves 31a to the right in FIG. 6, and the first lens group 22 is extended in the direction of the optical axis A to follow the movements of the cam pins 32a in lift zones 31a-1 of the cam grooves 31a in FIG. 6.

When the cam pins 32a are moved up to zones 31a-2 of the cam groove 31a corresponding to the photographing position, the first lens group 22 is kept stopped at a corresponding position, while the differential cylinder 32 is kept rotating. When the cam pins 32a are in the zones 31a-2, the gear portion 32c (shown in FIG. 4) formed on a rear part of the outer periphery of the differential cylinder 32 is in mesh with the speed reducing gear 102, whereby the rotational driving force is transmitted from the differential cylinder 32 to the gear 102.

The rotational driving force is transmitted from the speed reducing gear 102 via the speed reducing gear 101 and the prism drive gear 100 to the rack portion 10c of the prism holding member 10, whereby the prism holding member 10 is driven to the photographing standby position.

To return the first and second lens groups 25, 26 from the photographing state to the storage state, a reverse operation opposite to the above operation is performed. The first and second lens groups 25, 26 are stored in the camera main body after the prism 9 is retreated from the fixed cylinder 31.

Next, with reference to FIGS. 7 to 10, a description will be given of a lock mechanism to prevent the barrel from being damaged due to external impact applied to the barrel in the photographing state or due to falling accident of the image pickup apparatus in which the barrel is in the photographing state.

Figure 7:
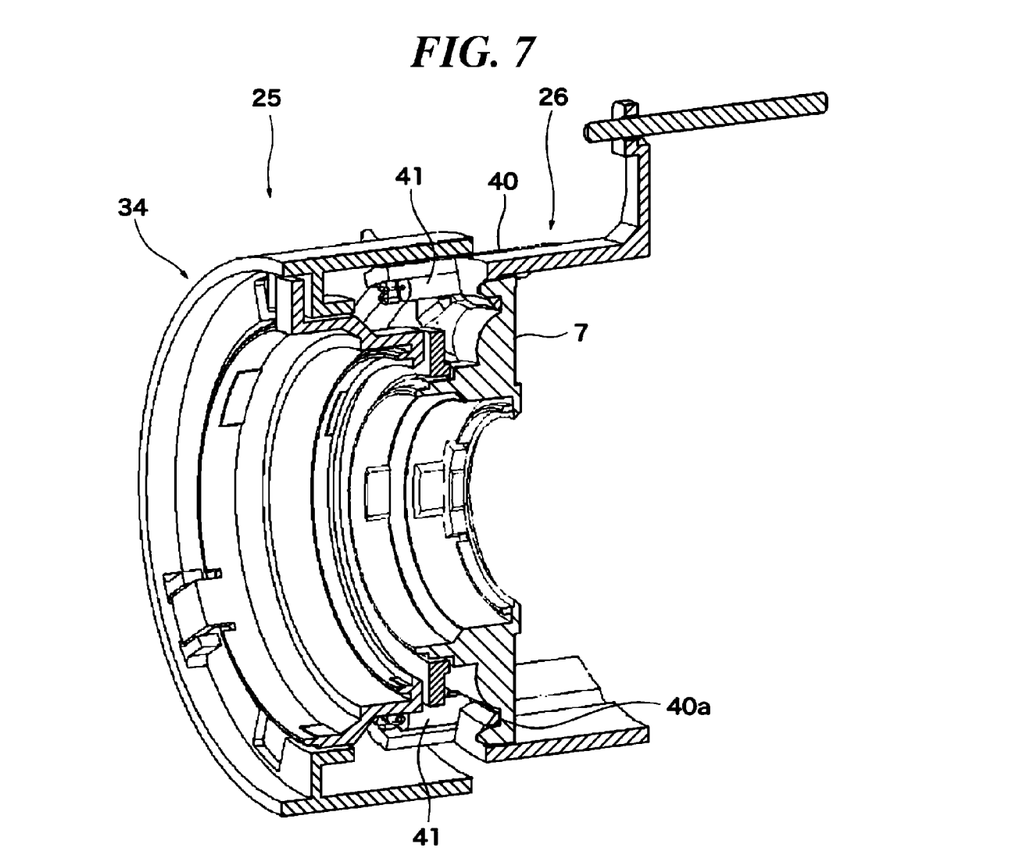
FIG. 7 is a broken-away perspective view showing respective halves of first and second lens groups in the photographing state.

FIG. 7 shows in perspective view the first and second lens groups 25, 26 which are in the photographing state (WIDE). In the photographing state, the second group lens holder 7 is movable in the direction of the optical axis A in unison with the second group holding member 40 in a state that the lens holder 7 is positioned by being in press-contact with the abutment portion 40a of the holding member 40 by the urging force of the spring 41.

If an external impact force is applied to the barrel in the photographing state or if the image pickup apparatus in which the barrel is in the photographing state is accidentally fallen, the second group lens holder 7 can be moved against the urging force of the spring 41 and decoupled from the second group holding member 40. In that case, there is a fear that the lens holder 7 collides with, e.g., the prism holding member 10 and is damaged.

Figure 8:
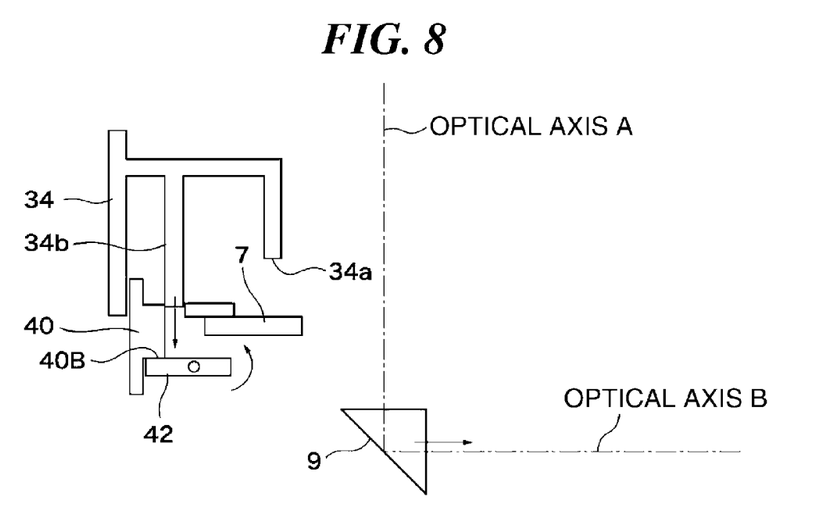
FIG. 8 is a schematic view showing a lock mechanism in the photographing state.
Figure 9:
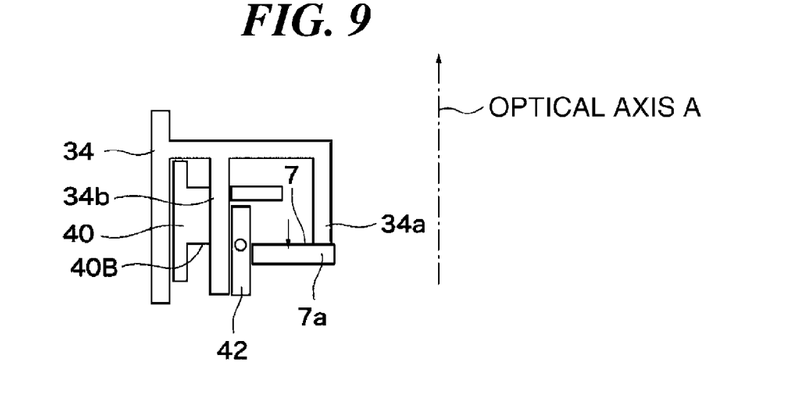
FIG. 9 is a schematic view showing the lock mechanism in the storage state.

To obviate this, the lock mechanism shown in FIGS. 8 and 9 is provided.

Figure 10:
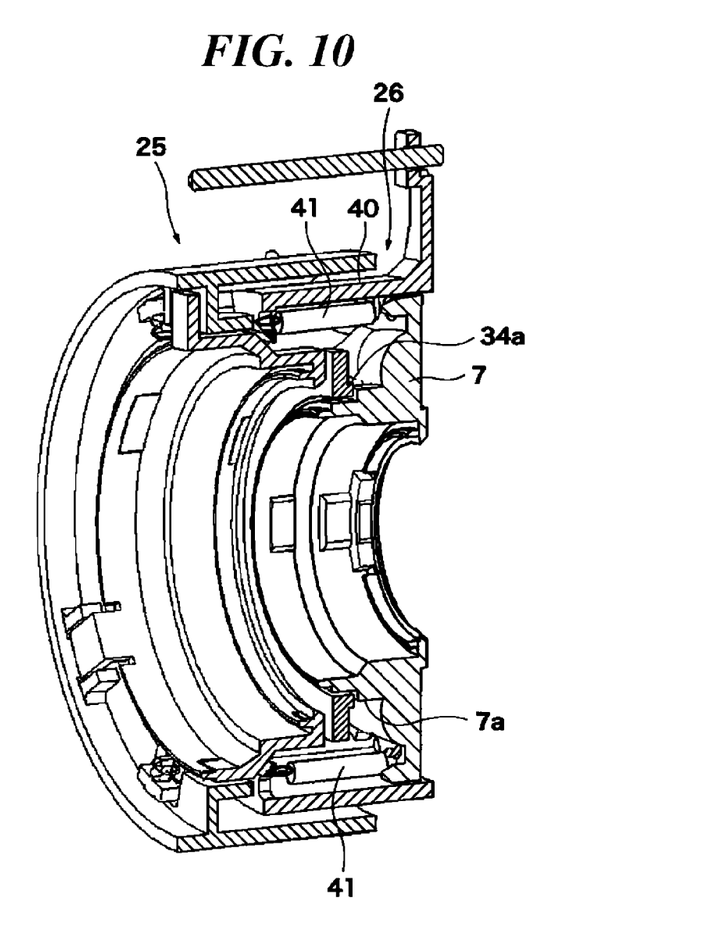
FIG. 10 is a broken-away perspective view showing respective halves of the first and second lens groups in the storage state.

FIGS. 8 and 9 show the lock mechanism in the photographing state and in the storage state, and FIG. 10 show in perspective view the first and second lens groups 25, 26 in the storage state.

In the photographing state shown in FIG. 8, when a falling impact force is applied, e.g., in a downward direction in FIG. 8 to the second group lens holder 7, the lens holder 7 interferes with a lock lever 42 provided on the second group holding member 40, thereby being prevented from moving by more than a predetermined amount. It is therefore possible to avoid barrel components from being damaged. However, in a state that the second group lens holder 7 interferes with the lock lever 42, the lens holder 7 cannot be moved toward the storage position. To obviate this, an unlock mechanism operates as described below, so that an operation for storing the barrel components can be made.

Specifically, at start of the storage operation, the prism 9 is retreated along the optical axis B to the outside of the barrel, and then the first group barrel 34 starts to retreat along the optical axis A. Thus, an unlock portion 34b of the first group barrel 34 causes the lock lever 42 to rotate anticlockwise against an urging force of a spring (not shown). When the lock lever 42 rotates 90 degrees as shown in FIG. 9, the lock lever 42 is brought into a state not interfering with the second group lens holder 7 as viewed in the direction of the optical axis A. In that state, when the first group barrel 34 retreats toward the storage position, the abutment portion 34a of the first group barrel 34 is brought in abutment with the flange portion 7a of the second group lens holder 7. Further, the first group barrel 34 continues to retreat together with the second group lens holder 7, and the first group barrel 34 and the second group lens holder 7 retreat to the storage position against the urging force of the spring 41, whereby the storage state shown in FIGS. 9 and 10 is achieved.

In short, the lock mechanism is configured as described below.

In the lock mechanism, the lock lever 42, which is rectangular in cross section, is pivotably attached to a predetermined place of the second group holding member 40. Specifically, the lock lever 42 is pivotably attached via a shaft to the holding member 40 at a location deviated from the center of the lock lever 42 toward one end thereof on the side close to the second group lens holder 7.

The lock lever 42 is urged by a spring (not shown) so as to be rotated clockwise as viewed in FIG. 8, so that the lock lever 42 is brought in contact with a stopper 40B of the second group holding member 40.

As shown in FIG. 9, the unlock portion 34b which is rectangular in cross section projects from the first group barrel 34 and is disposed adjacent to the lock lever 42.

The stopper 40B of the second group holding member 40 is disposed to be adjacent to the unlock portion 34b.

The flange portion 7a of the second group lens holder 7 is disposed above the one end of the lock lever 42 on the side close to the second group lens holder 7 in FIG. 8.

In the photographing state shown in FIG. 8, the lock lever 42 is rotated anticlockwise in FIG. 8 by the urging force by the spring (not shown) so that the lock lever 42 is brought into a stop state where the lever 42 is made in contact with and held by the stopper 40B of the second group holding member 40.

In this stop state, when a falling impact force is applied to the second group lens holder 7, the second group lens holder 7 is moved downward in FIG. 8. The flange portion 7a of the second group lens holder 7 is brought in contact with the one end of the lock lever 42 on the side close to the second group lens holder 7, and attempts to rotate the lock lever 42 clockwise in FIG. 8. However, since another end of the lock lever 42 is in contact with the stopper 40B of the second group holding member 40, the lock lever 42 is not rotated but remains at the illustrated position, thereby preventing the second group lens holder 7 from being moved downward. As a result, it is possible to prevent the second group lens holder 7 from colliding with, e.g., the prism holding member 10 and from being damaged.

When the barrel is shifted from the photographing state to the storage state, the first group barrel 34 and the second group holding member 40 are retracted so as to overlap with each other. At that time, the unlock portion 34b of the first group barrel 34 presses an end portion of the lock lever 42 on the side close to the stopper 40B, thereby rotating the lock lever 42 anticlockwise against the urging force of the spring member so that the lock lever 42 assumes a position extending along the optical axis A. As a result, the lock lever 42 is out of contact with the flange portion 7a of the second group lens holder 7, as shown in FIG. 9.

Thus, a shift to the storage state is made, where the second group lens holder 7 and the first group barrel 34 are retracted into the second group holding member 40.

When the barrel is shifted from the storage state to the photographing state, the first group barrel 34 is pulled out from the second group holding member 40, whereby the unlock portion 34b of the first group barrel 34 is decoupled from the lock lever 42.

As a result, lock lever 42 is rotated clockwise by the urging force of the spring (not shown) and shifted to the stop state as shown in FIGS. 8 and 9.

The above-described barrel having the bending optical system is configured to automatically make a shift between the stop state and the stop released state, with a shift between the storage state (retracted state) and the photographing state. Therefore, the barrel can be made compact and at the same time can have impact resistance by using the lock mechanism which requires a less number of component parts, is simple in construction, and is small in size.

It should be noted that this invention is not limited to the above-described embodiment, and various changes and modifications may be made without departing from the spirit and scope of the invention.

For example, in the embodiment, the guide hole 10k on the rear end side of the engagement portion 10a of the prism holding member 10 is formed into an elongated hole to provide the degree of freedom in positioning the prism holding member 10. Alternatively, in this invention, the rear-end side holding portion (shown at 43c in FIG. 11) of the housing 43 can be received in an elongated hole like the guide hole 10*k*. Specifically, a hole into which the guide shaft 37 is fitted can be formed in a first bearing portion that supports the tip end of the guide shaft 37, and an elongated hole that provides a degree of motion freedom in the direction of the plane including the guide shafts 36, 37 can be formed in a second bearing portion that supports the rear end of the guide shaft 37.

In that case, the prism holding member 10 can be properly positioned by providing the degree of freedom in which the prism holding member 10 is rotatable in the direction of the B-C plane including the guide shafts 36, 37.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2009-116440, filed May 13, 2009, which is hereby incorporated by reference herein in its entirety.

What is claimed is:

1. An optical element positioning apparatus for moving an optical element from a storage position to a use position on an optical path and for positioning and holding the optical element at the use position, comprising:

first and second guide shafts configured to guide a holding member that holds the optical element such that the holding member is movable between the storage position and the use position;

holding portions provided in a stationary member and configured to hold ends of said first and second guide shafts on a side close to the use position of the optical element;

guide-supporting and receiving portions provided in the holding member and formed with guide holes through which said first and second guide shafts are slidably inserted; and an urging device configured to urge holding-member positioning parts of the guide-supporting and receiving portions of the holding member moved to the use position such that the holding-member positioning parts are made in press-contact with ends of said holding portions.

2. The optical element positioning apparatus according to claim 1, including:

a setting device configured to set a degree of freedom in positioning the holding member at the use position in a plane including said first and second guide shafts, wherein said setting device has a first bearing portion that supports the end of said second guide shaft on the side close to the use position of the optical element, and a second bearing portion that supports a rear end of said second guide shaft, the end of said second guide shaft is fitted into the first bearing portion, and the second bearing portion movably supports the rear end of said second guide shaft such as to provide the degree of freedom in positioning the holding member.

3. The optical element positioning apparatus according to claim 1, wherein the urging device includes:

a drive gear configured to be able to be in mesh with a rack which is provided integrally with the holding member and which has a non-tooth portion where said drive gear freely rotates;

a spring member having one end thereof fixed to the drive gear and having an arm portion at another end thereof configured to elastically press a force receiving portion of the holding member formed at a rear end of the non-tooth portion of the rack when the spring member rotates in unison with the drive gear; and a projection provided integrally with the drive gear and configured to move the force receiving portion to thereby bring the drive gear in mesh with the rack when the drive gear rotates in the non-tooth portion of the rack in a direction to move the rack toward the storage position.

\* \* \* \* \*